United States Patent
Miller

(10) Patent No.: US 9,414,040 B2
(45) Date of Patent: *Aug. 9, 2016

(54) METHOD AND SYSTEM FOR ASSISTING LANGUAGE LEARNING

(71) Applicant: Sony Corporation, Tokyo (JP)

(72) Inventor: Philip Miller, Encinitas, CA (US)

(73) Assignee: Sony Corporation, Tokyo (JP)

( * ) Notice: Subject to any disclaimer, the term of this patent is extended or adjusted under 35 U.S.C. 154(b) by 107 days.

This patent is subject to a terminal disclaimer.

(21) Appl. No.: 14/275,826

(22) Filed: May 12, 2014

(65) Prior Publication Data
US 2014/0248040 A1   Sep. 4, 2014

Related U.S. Application Data

(63) Continuation of application No. 13/645,355, filed on Oct. 4, 2012, now Pat. No. 8,761,574.

(51) Int. Cl.
- *H04N 9/80* (2006.01)
- *H04N 5/93* (2006.01)
- *H04N 9/87* (2006.01)
- *G11B 27/02* (2006.01)

(52) U.S. Cl.
CPC .............. *H04N 9/8715* (2013.01); *G11B 27/02* (2013.01); *H04N 5/93* (2013.01)

(58) Field of Classification Search
CPC ............................ G11B 27/02; H04N 9/8715
USPC .................. 386/239, 219, 285, 278, 323, 324
See application file for complete search history.

(56) References Cited

U.S. PATENT DOCUMENTS

| | | | |
|---|---|---|---|
| 8,761,574 B2 | 6/2014 | Miller | |
| 2005/0048449 A1 | 3/2005 | Marmorstein | |
| 2007/0015121 A1 | 1/2007 | Johnson | |
| 2007/0100597 A1* | 5/2007 | Jacquot | G06F 17/30905 703/20 |
| 2007/0269775 A1 | 11/2007 | Andreev | |
| 2008/0059145 A1 | 3/2008 | Wood | |
| 2008/0212938 A1 | 9/2008 | Sato | |
| 2009/0148823 A1 | 6/2009 | Pahwa | |
| 2014/0099082 A1 | 4/2014 | Miller | |

OTHER PUBLICATIONS

USPTO; Notice of Allowance issued in U.S. Appl. No. 13/645,355, mailed Feb. 18, 2014, 5 pages.
USPTO; Office Action issued in U.S. Appl. No. 13/645,355, mailed Nov. 13, 2013, 6 pages.

* cited by examiner

*Primary Examiner* — Robert Chevalier
(74) *Attorney, Agent, or Firm* — Fitch, Even, Tabin & Flannery LLP

(57) ABSTRACT

A method for annotating video content for assisting language learning is shown. The method includes identifying one or more objects in a video content, generating one or more language tags for at least one of the one or more objects, and associating the one or more language tags with utilization information, wherein the utilization information comprises display information configured to be used by a user device in the displaying of at least one of the one or more language tags with the video content.

20 Claims, 8 Drawing Sheets

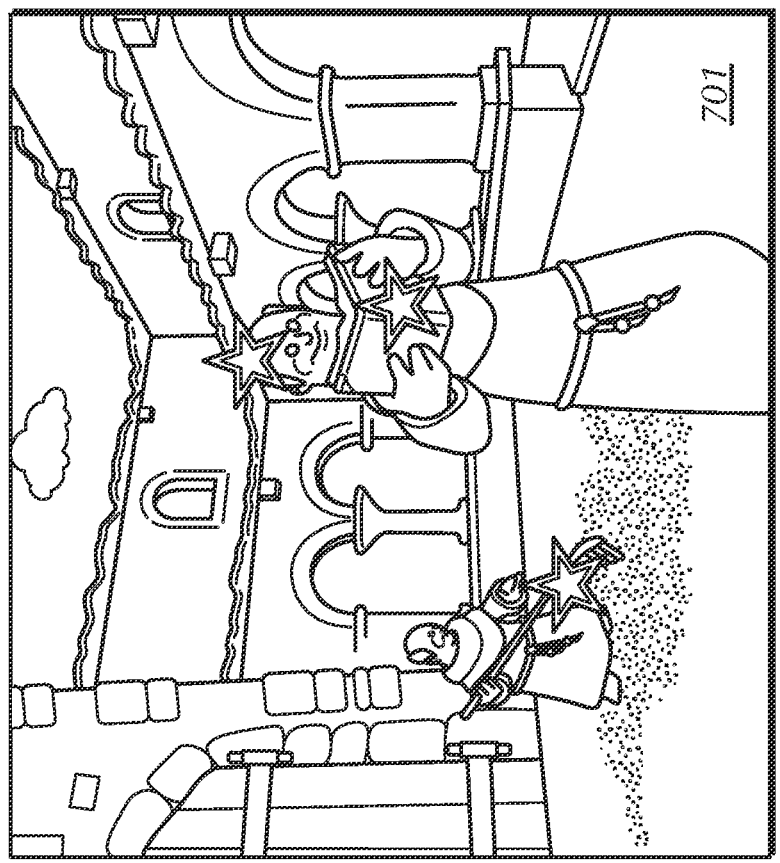
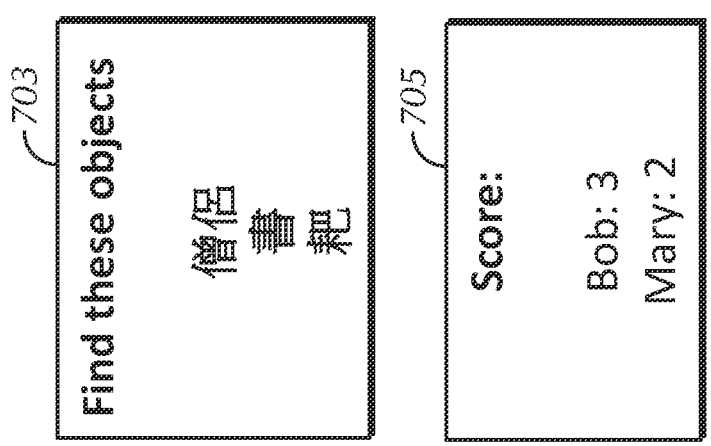
FIG. 7

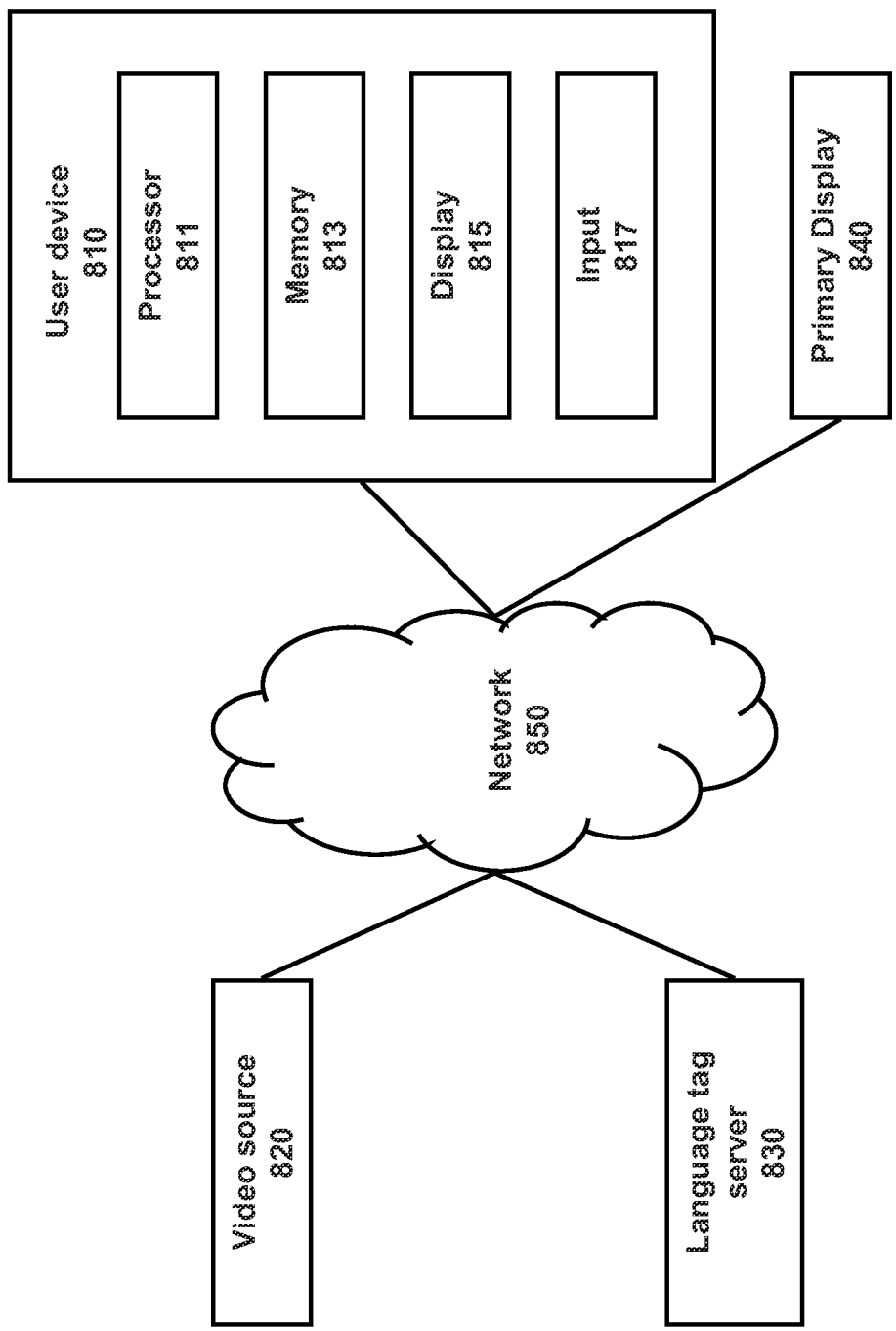

METHOD AND SYSTEM FOR ASSISTING LANGUAGE LEARNING

This application is a continuation of U.S. application Ser. No. 13/645,355, filed Oct. 4, 2012 which is incorporated in its entirety herein by reference.

BACKGROUND OF THE INVENTION

1. Field of the Invention

The present invention relates generally to language learning tools, and more specifically to providing annotations to video content for facilitating language learning.

2. Discussion of the Related Art

With the ever increasing globalization, more and more people are interested in learning second languages. Tools for assisting language learning is a fast growing market in the US and abroad. Various multimedia contents have been created for and used by language learners.

SUMMARY OF THE INVENTION

In one embodiment, the invention can be characterized as a method for annotating video content for assisting language learning. The method includes the steps of identifying one or more objects in a video content, generating one or more language tags for at least one of the one or more objects, and associating the one or more language tags with utilization information. The utilization information comprises display information configured for a user device in the display of at least one of the one or more language tags with the video content.

In another embodiment, the invention can be characterized as a method for presenting annotated video content for assisting language learning. The method includes the steps of displaying a video content comprising images of one or more objects, and displaying, on the same screen, one or more language tags based on utilization information of the one or more language tags, wherein each of the one or more language tags corresponds to at least one or the one or more objects in the video content.

In a further embodiment, the invention may be characterized as a method for annotating video content for assisting language learning. The method includes the steps of identifying one or more objects in a video content, generating one or more language tags corresponding to at least one of the one or more objects in the video content, and displaying the video content and the one or more languages tags on a display device.

BRIEF DESCRIPTION OF THE DRAWINGS

The above and other aspects, features and advantages of several embodiments of the present invention will be more apparent from the following more particular description thereof, presented in conjunction with the following drawings.

FIG. 7 is a figure showing an example another interactive content according to some embodiments of the present invention.

FIG. 8 is a simplified block diagram showing a system for assisting language learning according to some embodiments of the present invention.

Figure 1:
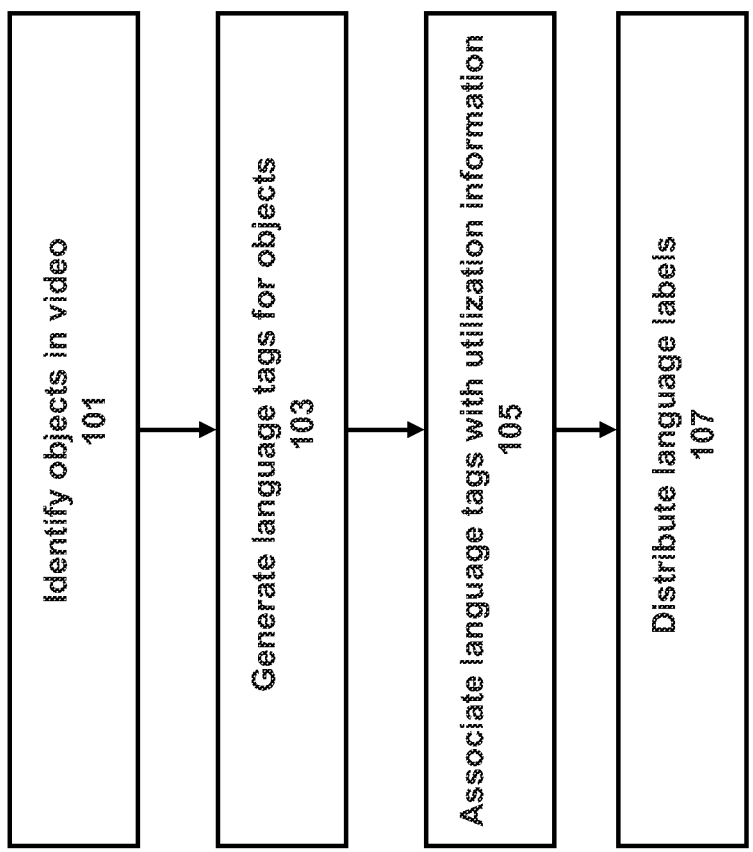
FIG. 1 is a process diagram showing a method for providing annotation to video content according to some embodiments of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Contextual language learning is one of the most effect ways of language learning. Learning a language in context and building language proficiency based on previous knowledge can enhance language comprehension and retention. One way language learners are exposed to a language in context is through media consumption, such as watching television programs and/or movies. Closed captioning provided with some television program and movie distributions is sometimes used by language learner as a way to acquire new vocabulary and better understand the content of the video. However, at the beginning and intermediate stages of language learning, closed captioning along is sometimes insufficient to assist a language learner in identifying and understanding new vocabulary and word usage in the video content.

Referring first to FIG. 1, a method for providing annotations to a video content according to some embodiments is shown. In some embodiments, the video may be a recorded video, a broadcast television program, a streaming web video etc. In step 101, one or more objects in a video are identified. Step 101 may be carried out by an object identifier module. In some embodiments, the identification of objects may be performed at least partially manually. For example, an object may be identified by one or more persons viewing the video. In some embodiments, the identification of the objects can be performed using available object recognition technology. For example, a program may automatically identify an object displayed on the screen based on its shape, color, relative size, movement, and/or the object's interaction with other objects. In some embodiments, image object recognition may be assisted by voice recognition technology. That is, the voice track of the video content can be used to confirm and/or enhance image-based object recognition. Object recognition may be based on multiple frames of a video to enhance the accuracy of identification. An identified object may include an inanimate object, an animal, a plant, a person, a structure, a geographical feature, an astronomical feature etc. In some embodiments, the identifying of objects, whether performed manually or computer-aided, includes identifying the motion or action of the object. For example, using multiple frames of the video, the object may be identified to be in the motion of falling, floating, bouncing, flying, running, spinning, speaking, dancing, swaying, etc. In some embodiments, object recognition is performed with a combination manual identification and object recognition technology.

In step 103, an object identified in step 101 is associated with one or more language tags. Step 103 may be carried by a language tag generator module. A language tag may be generated to include one or more attributes of the object in one or more language. Attributes of the object may be properties such as name, color, shape, location, and motion of the object. In general, a language tag includes a word or a phrase associated with an on screen object or event. The language tags may be in any language such as English, Spanish, French, German, Chinese, Hindi, Russian, Arabic etc. The tags may be in the same or a different language than the language(s) used in the video. In some embodiments, the tags include one or more languages. For example, language tags for a Spanish language video can include names of objects in both Spanish and English.

In some embodiments, one or more objects in the video content may be ignored in step 101 or 103 based on criteria such as duration, size, and visibility. In some embodiments, the object identifier or the language tag generator may ignore an object appearing in the video for a duration shorter than a minimal threshold. In some embodiments, the object identifier or the language tag generator may ignore an object below a certain size threshold, or is obstructed from view beyond a certain percentage. In some embodiments, the language tag generating step may leave out objects with names and/or attributes that are too common, too obscure, too easy, and/or too difficult. For example, in some embodiments, objects identified as man, woman, boy, and girl would be automatically left out of an identified object list because they are too common and occur with too high of a frequency.

In step 105, a language tag is associated with utilization information. Step 105 may be carried out by a utilization information generating module. Utilization information may include information on how to use the content of the language tag. In some embodiments, utilization information may include display information such as one or more time periods during which the corresponding object appears in the video, display duration of the language tag, position(s) of the object associated with the language tag, and/or the display position of the tags. In some embodiments, the utilization information allows a user device to display the language tags as overlays of the video content in a way as to label one or more objects in the video content. For example, the utilization information may identify frames in which a language tag should appear and the proper locations of the language tag in each of the frames. In some embodiments, the display position of the language tag may be manually or automatically adjusted to avoid obstructing important characters or actions in the video image. In some embodiments, the utilization information includes information used to generate supplemental content to assist language learning. For example, the utilization information may include word difficulty, alternate spelling, alternate forms or tenses, definition, synonyms, antonyms, sample sentence, etc. In some embodiments, the utilization information includes additional attributes of the object, such as color, size, size, motion, and locations etc.

In step 107, one or more language tags are distributed. The language tags may be distributed with the video content. For example, the language tags may be distributed through physical storage mediums along with the video content, such as through DVD and Blue-ray discs. The language tags may be distributed over a data network through streaming content or non-streaming downloads. The language tags may also be distributed along with its associated video content through over-the-air or cable broadcasting and/or a data network such as the Internet. In some embodiments, the language tags are distributed as audio stream tags of a streaming video. In some embodiments, the language tags are provided as a file that can be used by a user device to display the language tags along with a separately obtained video content. For example, language tags can be configured to be utilized by a media player as a plug-in or add-on to video content.

The steps of shown in FIG. 1 may be used by a video content provider, a third party, and/or a user device. The method may be carried out in one device or over multiple devices. For example, a device or a module may be used to process the video and perform object recognition. A separate device or module may generate the language tags and/or the utilization information. The steps may be performed on a stored content such as a video file or in real time on a broadcast or streamed content. The steps may be performed prior or during the playback of the video content.

Figure 2:
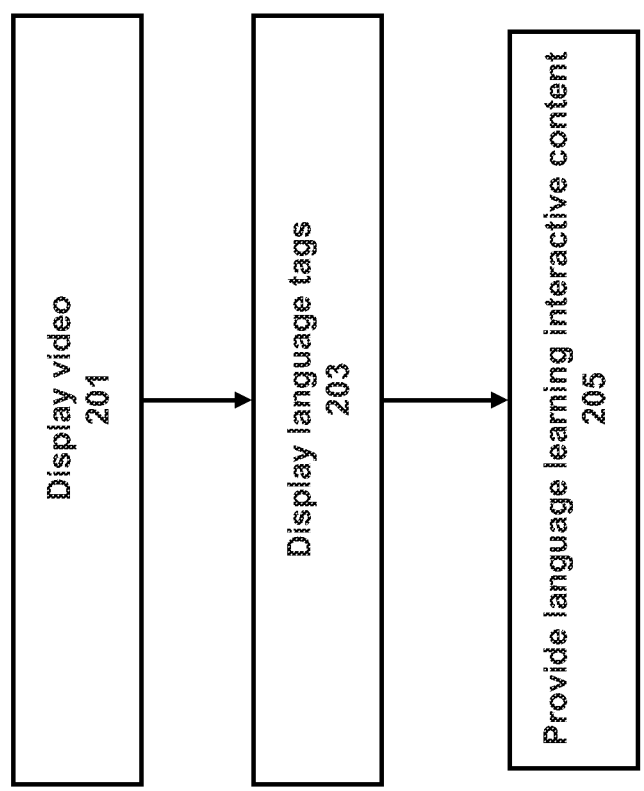
FIG. 2 is a process diagram showing a method for presenting an annotated video content for assisting language learning according to some embodiments of the present invention.

Referring next to FIG. 2, a process for presenting annotated video content according to some embodiments is shown. In step 201, a display device displays a video content. In some embodiments, the video may be a video stored locally on a computer readable medium such as a DVD, Blue-Ray discs, hard drive, or RAM. In some embodiment, the video may be an over-the-air or cable broadcast television or movie program, an on-demand program, a streaming or non-streaming web video, etc.

In step 203, the user device displays language tags. The user device may receive the language tags along with the video content or obtain the language tags separately. For example, the video content may be a streaming web video and the language tags may be received as the audio stream tag of the video stream. In some embodiments, the video content may be a broadcast television program while the language tags are locally stored on the user device. In yet another embodiment, the video content may be stored locally, while the language tags and/or interactive content are streamed from a remote source.

The language tags may be displayed on a display device along with the video content. In some embodiments, the display of the language tags is at least partially based on the utilization information of the language tags. For example, the user device may determine when and/or where to display to language tags based on the display timing and display position information in the utilization information. In some embodiments, the user display can make further adjustment to the display of the language tags. For example, the user device may adjust the size, color, font, position, etc of the language tags based on automatic or user selected settings.

In some embodiments, the language tags are displayed as labels overlaying the video content in a way as to identify one or more objects by its one or more attributes, such the object's name, color, shape, motion, location, etc. In some embodiments, the language tags are displayed as a sidebar to the video content. A sidebar may refer to a display frame to the left, right, top, or bottom of the main video. Embodiments of the sidebar display are described in more detail with reference to FIG. 5 below. In some embodiments, the user is given the option to turn on and off the display the language tags. When the language tag display is turned off, the video content may be display in its original form, without overlays and/or sidebars. In some embodiments, the language tags are only displayed when the video is paused. In some embodiments, the language tags may be displayed in along with any optional closed captioning.

In some embodiments, the language tags are selectively displayed based on user's language skill level or settings. For example, the language tags may be grouped into difficulty levels such as beginner, intermediate, and advance based on the vocabulary of the language tag. In some embodiments, the difficulty level can be part of the utilization information of a language tag. In some embodiment, the user device determines the difficulty of a vocabulary when it receives the language tag. The user device may display language tags in selected difficulty levels according to a user's language proficiency level and/or user setting. In some embodiments, a program on the user device stores a word list mastered by a user, and filters out language tags associated with words on the learned-word list. The selectively display may create an annotation that is tailored to the language skills and needs of the language learner.

In step 205 a user device may optionally provide supplemental content. Supplemental content may be received from the provider of the video content and/or the provider of language tags. In some embodiments, the supplemental content may be generated by the user device.

In some embodiments, the supplemental content may be created based on the content of the video and/or the language tags. In some embodiments, supplemental content may include interactive content such as a single player game, a multiplayer game, a quiz, a lesson, and/or a memory reinforcement activity. For example, the interactive content may be a matching game that asks the user to match names of objects in the language tags to images of objects in the video. In some embodiments the interactive content may include fill in the blank, multiple choice, true or false, or open ended questions. In some embodiments, the interactive content includes clips of the video content.

In some embodiments, the supplemental content is generated or selected based on the user's language skill level. User's language skill level may be determined based on user's previous interaction with a program, such as previous quiz results. In some embodiments, user's language skill level may be based on user's self identification and/or based on information obtained from another source such as user's score from a standardized test. In some embodiments, vocabularies and/or the format of the interactive content are selected according to user's language proficiency level. In some embodiments, a program stores words previously learned by a user and uses the stored learned words to determine user's language proficiency level. In some embodiments, the supplemental content may utilize the learned-word list to reinforce the learning of new words.

In some embodiments, the supplemental content provides information that may help a user understand and retain new vocabularies, phrases, or usages. The supplemental content may include alternate spellings, alternate forms or tenses, definition, synonyms, antonyms, sample sentences, additional images, additional videos etc. In some embodiments, some supplemental content may be part or be based on language tag's utilization information. In some embodiments, a program on the user device uses the content of a language tag to retrieve the supplemental content either from a local storage or from a remote server. For example, the program may allow the user to select a language tag and display additional images and/or videos associated with that a vocabulary in the language tag. The additional images and/or videos can be retrieved from a remote server. In some embodiments, the additional images and/or videos are retrieved from the result of a search engine search using the language tag's vocabulary or phrase.

The method shown in FIG. 2 may be performed by one or more local, cloud-based, or web-based program or application accessed from a user device. In some embodiments, some or all of steps 201-205 are performed by an application (or "app") running on a user device such as a smart television, smart phone, personal computer, tablet computer, game console, and media player etc. In some embodiments, some or all of the steps 201-205 are performed by an application on a remote server which is accessed through an interface on a user device.

Figure 3:
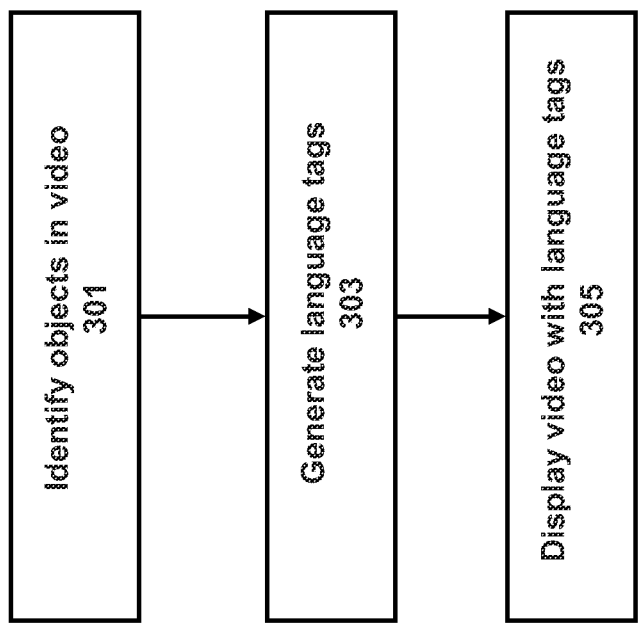
FIG. 3 is a process diagram showing a method for providing annotated video content for assisting language learning according to some embodiments of the present invention.

Referring next to FIG. 3, a process for providing annotated video content for assisting language learning according to some embodiments is shown. In step 301, one or more objects in a video content are identified. In some embodiments, the video content may be a stored on a local storage of the user device. In some embodiments, the video content is streamed or broadcasted to the user device. In some embodiments, step 301 is performed in real-time as the content is received and/or displayed at the user device. The identifying of object in step 301 may be similar to step 101 of FIG. 1. That is, in some embodiments, the object recognition may be performed with object recognition technology or be performed manually. In some embodiments, object recognition may be carried out entirely on the user device or may include queries to a remote server. Settings on the user device may affect the object recognition step. For example, the user device can set filters defining objects to ignore or include during object recognition based on criteria such as object type, vocabulary difficulty, object size, object appearance duration, etc.

In step 303, language tags are generated based on objects identified in step 303. In some embodiments, step 303 may be similar to step 103 of FIG. 1. In some embodiments, the language tags are generated according to at least some automatic or user selected setting of the user device. For example, the generating of language tags may leave out words that are on a learned-word list associated with the user. In some embodiments, the generating of language tags is based on selecting identified objects based on user language proficiency level and/or user setting. In some embodiments, the display parameters of the language tags may be determined based on the screen size and/or other user preferences in step 303. In some embodiments, the language(s) of the language tags is selected based on user setting.

In step 305, the user device displays the video content with language tags. Step 305 may be similar to step 203 of FIG. 2. The language tags can be displayed in variety of ways based on automatic and/or user selected setting. In some embodiments, a language tag is displayed as an overlay of the video content next to the object associated with the language tag such that the language tag labels the object. In some embodiments, language tags are displayed as a sidebar to the video content.

Steps 301-305 may be performed by one or more local, cloud-based, or web-based program or application accessed from a user device. In some embodiments, some or all of steps 301-305 are performed by an application (or "app") running on a user device such as a smart television, smart phone, personal computer, tablet computer etc. In some embodiments, some of all of the steps 301-305 are performed by an application on a remote server accessed through an interface on a user device.

Optionally, the user device executing a program for running steps 301-305 can also provide supplemental content to the user. In some embodiments, supplemental content includes interactive content. The supplemental content can be generated based on the information obtained in step 301 and/or step 303. The supplemental content can also be generated based on user language proficiency level or user's previous interaction with the program. In some embodiments, generating of supplemental content may be similar to step 205 of FIG. 2.

Figure 4:
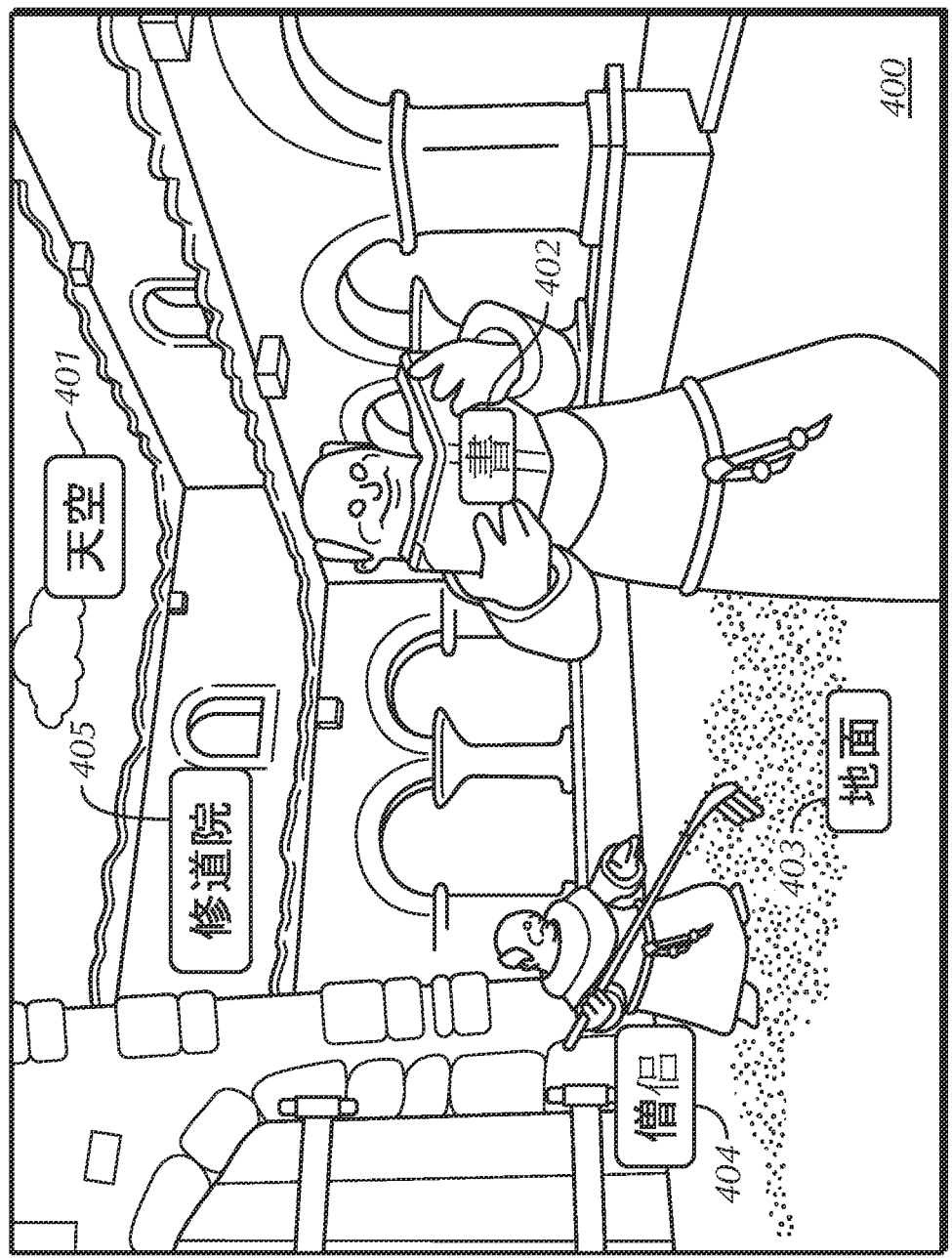
FIG. 4 is a figure showing an example of an annotated video content according to some embodiments of the present invention.

Referring next to FIG. 4, an example annotated video content according to some embodiments is shown. FIG. 4 shows language tags 401-405 being displayed as overlay labels of video content 400. Video content 400 shows two monks in a monastery, in which one monk is in the foreground holding a book and another monk is in the background holding a rake. Language tags 401-405 display names of objects in Mandarin Chinese and are each displayed next to their associated objects as to identify the objects. Namely, language tag 401-405 contains Chinese characters for "sky," "book," "ground," "monk," and "monastery" and are positioned near the sky, a book, the ground, a monk, and a monastery in the video content respectively. By labeling objects and features in the video image, a viewer can learn these vocabularies through context. The labels can also help the viewer better understand events and conversations in the video content.

In some embodiments, the language tags 401-405 are selectable. For example, a user may select language tag 402 using user input means to bring up supplemental content associated with the word "book." In some embodiments, the video content may pause or become a smaller picture-in-picture display when supplemental content is triggered. The supplemental content may be additional images, videos, definition, translations, dictionary entry, or sample sentences associated with the selected language tag. The supplemental content may be stored locally or be retrieved on the fly from a remote server. In some embodiment, supplemental content is at least partly based on the information in the utilization information. The supplemental content may include interactive content such as a quiz, a game, a reinforcement activity etc. In some embodiments, selecting the language tag may give a user the option to add the word to a learned-word list or to add the word to a words-to-learn list. These lists may then be used by the program to select language tags for display and/or generate supplemental and interactive content.

The display illustrated in FIG. 4 is provided as an example only, many other implementations of the language tag display is possible without departing from the spirit of the present disclosure. In some embodiments, the language tags may move with the movement of the associated object in the video content. For example, if the monk labeled by language tag 404 walks across the screen, language tag 404 may follow him across the screen. In some embodiments, the language tags appear in other colors, sizes, and/or backgrounds that may be adjusted by the user or according to the specifications of the display device. In some embodiments, the language tags include words in two or more languages. For example, language tag 401 may include the English word "sky" in addition to Chinese characters. In some embodiments, the user may switch the language tag overlays on and off during video content playback. In some embodiments, the user may change the language tag's language. For example, a user may push a button to change all the displayed language tags into Spanish or English. In some embodiments, the user may select a language tag and see the word in the tag in another language. In some embodiments, the language tags are displayed when the video content is paused.

The display shown in FIG. 4 may be a full screen display, a display within an application interface, or a display within a web browser. In some embodiments, a user device running a program may receive language tags 401-405 that are generated remotely. In some embodiments, a user device uses object recognition software to automatically generate the language tags 401-405. The language tags 401-405 may be generated prior or during the display of the video content.

Figure 5:
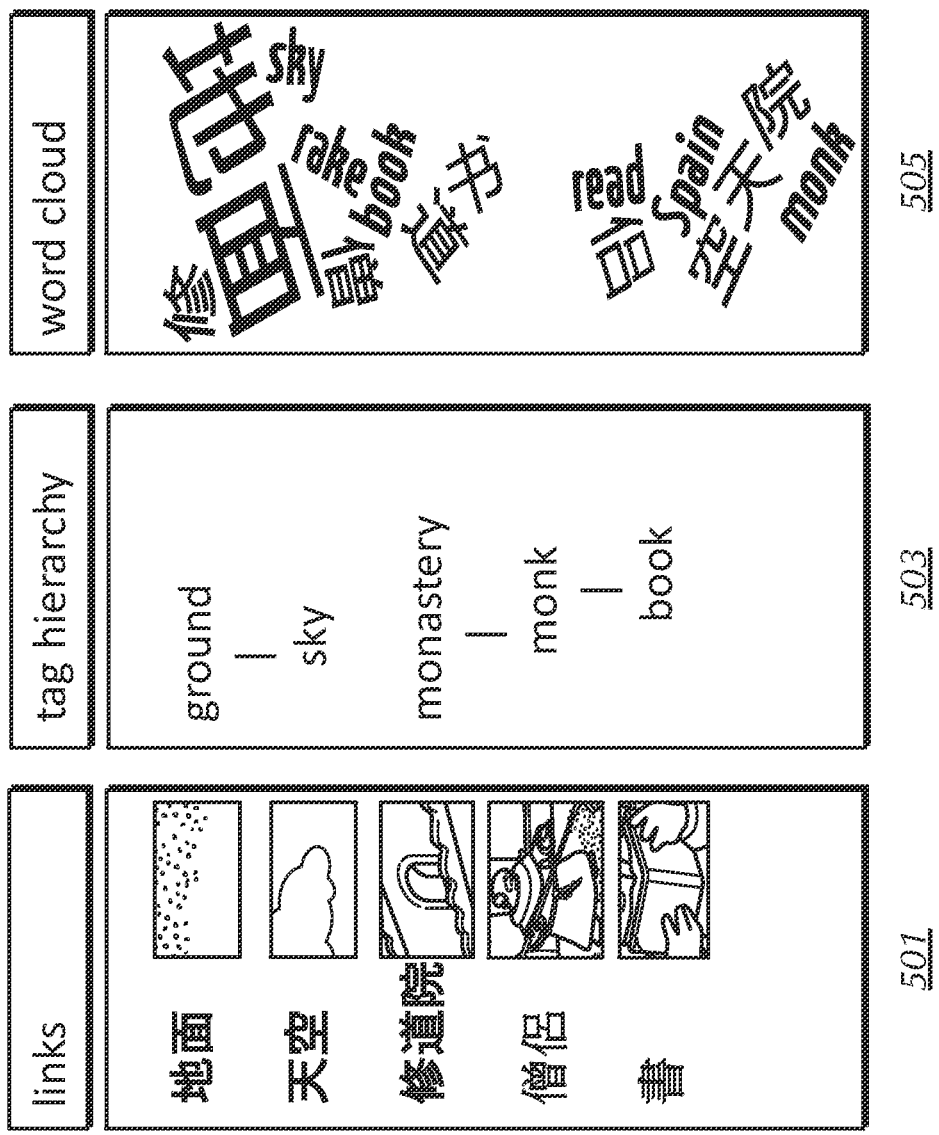
FIG. 5 is a figure showing examples of sidebar displays according to some embodiments of the present invention.

Referring next to FIG. 5, examples of sidebar annotation according to some embodiments is shown. A sidebar is a content frame displayed with the video content. A sidebar may be displayed on top, bottom, left, or right of the main video display. The sidebar display may overlay the video content, partially overlay the video content, or be positioned outside of the video content display area. In some embodiments, a sidebar is displayed on a separate screen of the same device or a separate device.

Sidebar 501 is an example of a sidebar showing links between images of objects and their associated language tag words. In sidebar 501, Chinese characters for ground are placed next to an image of ground, and characters for sky are placed next to an image of sky, and so forth. The images of objects may be a cropped screen capture of the video content.

Sidebar 503 is an example of a sidebar showing language tags in a tag hierarchy. For example, ground is shown to have a relationship with sky. The tag hierarchy also shows a relationship between the monastery, the monk, and the book in the video content. In some embodiments, the relationships described in a tag hierarchy may be a relationship in the definition of the words, such as words that describe similar, opposite, or related objects or concepts. In some embodiments, the relationship described in a tag hierarchy may correspond to the objects' relationship within the video content. A tag hierarchy can provide additional contextual information to a language learner to enhance language learning and retention.

Sidebar 505 is an example of a sidebar showing language tags in a word cloud. A word cloud may present language tags in a shuffled way and in various sizes, color, and orientations. Although sidebar 505 shows words in two languages, in some embodiments, a word cloud may include words in one language, or three or more languages. A word cloud may provide additional information to a language learner by varying the position and sizes of the words according to the content of the video. For example, the name of an object more prominently shown in the video content may be shown in a larger font in the word cloud. The word cloud may be an animation and changes with the changes in the video content. A word cloud may also help reinforce vocabulary learning through requiring a user to visually search for familiar and unfamiliar words.

Sidebars 501, 503, and 505 may be displayed with or without the overlay tags 401-405 shown in FIG. 4. In some embodiments, two or more sidebars 501, 503, and 505 are shown at the same time. In some embodiments, a side bar is only displayed when the user selects it for display, and/or the video content is paused. In some embodiments, the sidebars may be interactive. For example, words and/or images in a sidebar can be selected to display supplemental content, similar to the tags 401-405 in FIG. 4. In some embodiments, how the language tags are displayed in the sidebar may change according to a user's interaction with the sidebar and/or video content. In some embodiments, selecting a word or an image in the sidebar causes the video to go to a playback location corresponding to that word or image. For example, when a user selects the word "book" in one of the sidebars 501, 503, and 505, a segment of the video content showing the book may be displayed.

Figure 6:
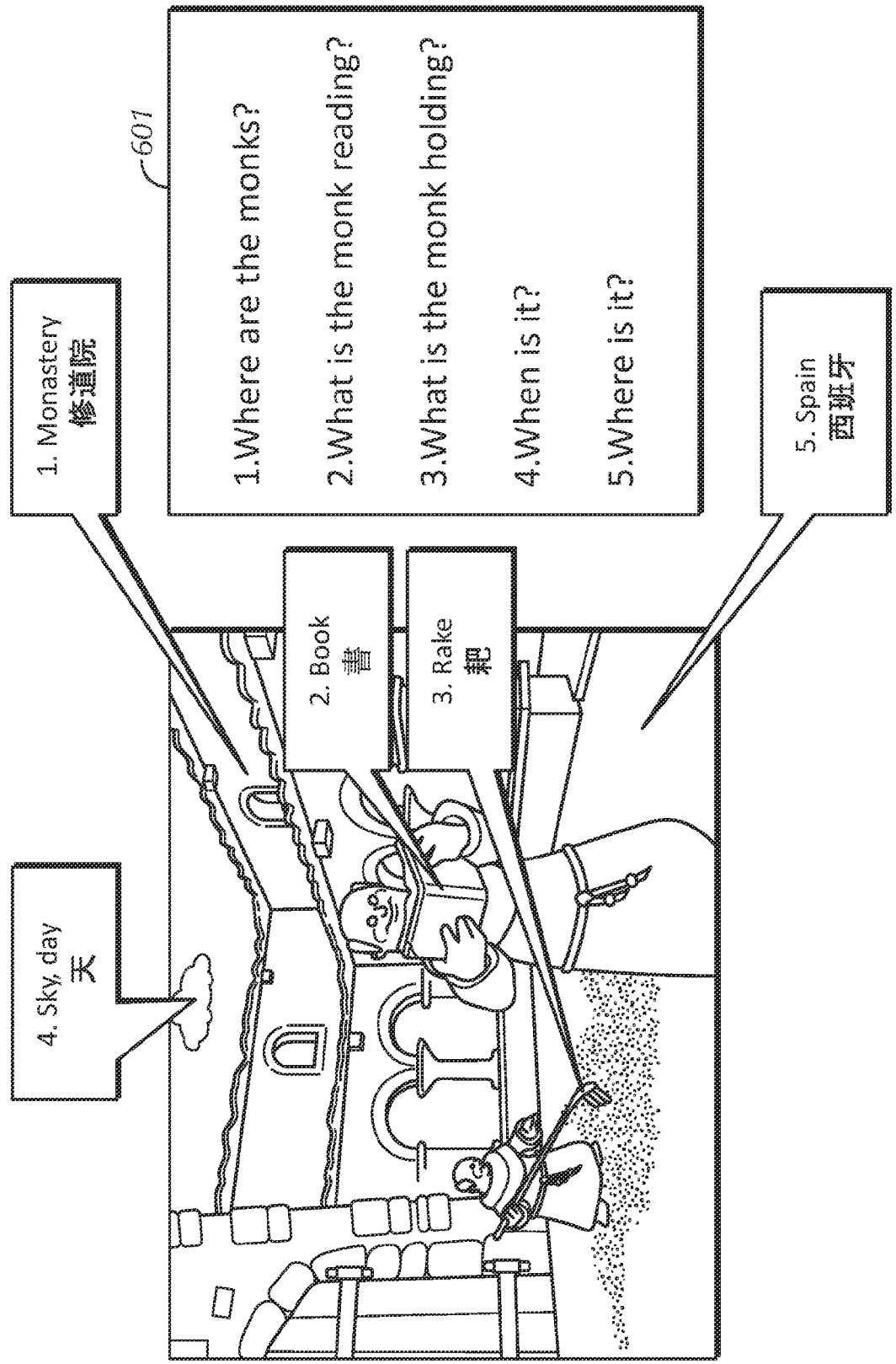
FIG. 6 is a figure showing an example an interactive content according to some embodiments of the present invention.

Referring next to FIG. 6, an interactive content according to some embodiments is shown. In FIG. 6, a list of questions 601 is displayed to a user. In some embodiments, the questions may be displayed individually and be displayed with or without the video content. In some embodiments, questions can be presented in an audio format to a user. The user may answer quiz questions by selecting an area or object in the video image, selecting a language tag overlaying the video content or in a sidebar, selecting a answer from a list of possible answers, typing in an answer, and/or speaking the answer.

The questions may be in the language of the video content, the language of the language tags, user's primary language, and/or another language selected by the user. While the language tags in FIG. 6 are shown to be in two languages, the tags may include only one language or no words at all.

The questions may be provided with the video content and/or the language tags. The questions may also be automatically generated based on the video content, language tags, and/or utilization information by the content provider, the language tag provider, and/or a user device. For example, the first question "where are the monks?" may be automatically generated when a interactive content generator sees that the language tags associated with the video content includes the words "monastery" and "monk." The generating of quiz questions can further be based on additional attributes of the object such as color, shape, motions, and relative locations of objects in the content. In some embodiments, the generating of quiz is based on the plot content of the video and/or audio transcript of the video.

In some embodiments, the result of the quiz is stored by the program. The stored result can be used to assess a user's language skill language and/or in the selection and/or generation of other interactive content.

In some embodiments, the quiz questions are generated or selected based on the user's language proficiency level. For example, if a user is a beginner learner, the question may be "what color is the book?" For more advanced users, the questions may involve more difficult vocabulary such as "monastery" or involve plot event of the video content. For example, a question for more advanced language learners may be "why did the monks come to the monastery?"

Referring next to FIG. 7, a multiplayer game according to some embodiments is shown. FIG. 7 shows a game in which players Bob and Mary competes to identify objects in the video content 701. In box 703, words associated language tags in the video content are shown. Namely, Chinese characters for "monk," "book," and "rake" are shown. Players of the game can select objects in the video content 701 to win points. The video content may be paused or a screen capture of the video content may be used in the game. In some embodiments, the players identify objects during the playback of a video clip. In FIG. 7, correctly selected objects are marked with stars. Box 705 shows the scores of the two players. In some embodiments, the players may be playing on the same device using separate controllers, such as controllers of a game console. In some embodiments, the players may take turns playing. In some embodiments, the game is networked and the players compete through a network connection such as the Internet.

FIGS. 7 and 8 are provided as examples only, other examples of quizzes and games can be automatically or manually created based on video content and/or language tags. In some embodiments, interactive content also include audio components or are completely in audio format. The quizzes and games may be provided by as complete interactive content or may be provided as data that can be utilized by a program to generate interactive content.

Referring next to FIG. 8, a simplified block diagram of a system for providing annotation to video content according some embodiments is shown. The system may include a user device 810, a video source 820, a language tag server 830, a primary display 840 communication through a network 850. The user device 810 may further include a processor 811, a memory 813, a display 815, and an input 817. While several components are shown in FIG. 8, not all components are necessary in all embodiments of the present invention.

In some embodiments, the system may only include the user device. The user device may be any processor based device, such as a personal computer, a tablet computer, a smart phone, a smart television set, a game console, a TV set-top box, and/or a DVD or Blue Ray player. The video content may be stored locally in the memory 813 of the user device. The memory 813 may be a storage medium such a hard drive, ROM, RAM, DVD, and Blue-ray discs etc. Memory 813 may also be an external, remote, and/or cloud drive. In some embodiments, language tags and interactive content are also stored with the video content. In some embodiments, a program on the user device may cause the processor 811 to identify objects in the video content, generate language tags, and display the video content with the language tags on a display 815. The display may be integrated with the user device 810 or be a separate display. In some embodiments, the input 817 can be used to control the playback of the video content and/or interact with any interactive content. Input 817 may be any device for receiving user input such as a touch screen integrated with the display 815, a remote control, a keyboard, a mouse, a touchpad, a game controller, a microphone, a motion sensor etc. The program may also cause the processor 811 to generate interactive and/or supplemental content based on the video content.

In some embodiments, the system includes the video source 820 and the user device 810. The video source 820 may be a broadcast television content provider connected to the user device through over-the-air or cable network or the video source 820 may be a video content server connected the user device through a data network such as the Internet. The video content may be provided to the user device as a downloadable file or in a streaming format. In some embodiments, the video content provided by the video source does not include language tags. The user device 810 may identify the objects in the video content from the video source 820 to generate language tags and/or interactive content.

In some embodiment, the system includes a language tag server 830 and the user device 810. The user device 810 may use a video content from the video source 820 or from a local storage memory 813. The language tag server 830 may have access to the same content or a similar content. For example, the user device and the language tag server may both receive video content form the video source 820. The language tag server 830 may generate language tags using the video content. In some embodiments, the language tag server may further generate interactive content associated with the video content. The user device 810 may receive the language tags and/or interactive content from the language tag server 830 and utilize the language tags and/or interactive content with the corresponding video content. The language tags and interactive content may be downloaded or transmitted in a streaming format from the language tag server 830. While the language tag server 830 and the video source 820 are illustrated separately, in some embodiments, they can be implemented in the same system and/or on the same physical device.

In some embodiment, the system includes a video source 820, a language tag server 830, a primary display 840 and a user device 810. The primary display 840 may be another display such as a television. In some embodiments, the primary display 840 may display the video content with or without the language tags. In some embodiments, the user device 810 is a device with user inputs such as a tablet computer or a smart phone. The user device 810 may also display the video content with or without the language tags simultaneously with the primary display 840. In some embodiments, the user device 810 only displays sidebars and/or other supplemental content associated with the video content being displayed on the primary display 840. In some embodiments, the user device 810 may control what is displayed on the primary display 840 and can cause supplemental content to be displayed on the primary display 840. The language tags and/or the interactive content may be generated by either the video source 820, the language tag server 830, and/or the user device 810.

In some embodiments, the network 850 may comprise multiple networks. For example, the video source 820 may provide video content through over-the-air or cable broadcast, while the language tag server communicates with the user device 810 through a data network.

While FIG. 8 shows several components of the system, not all components are necessary in all embodiments. Additionally, in some embodiments, one or more of the components may be implemented on the same device. In some embodiments, one component may be implemented by a system of multiple devices.

With the systems and methods describe above, a language learner can tune to their favorite TV program or play their favorite movie, and use the language tags to helps him/her learn a language in context. Annotating video content for language learning also provides an enjoyable way that a language learner can learn new vocabulary and word usage through natural exposure to a language. The methods describe above can essentially transform any existing content into language education material and reduces the cost of producing language education material and interactive content, thus putting unlimited amount of language education material in a language learner's hands, with the ability to tailor the material to the interest and language skill level of each individual language learner.

Many of the functional units described in this specification have been labeled as separate steps in a process. A step may be implemented as a hardware circuit comprising custom VLSI circuits or gate arrays, off-the-shelf semiconductors such as logic chips, transistors, or other discrete components. A step may also be implemented in programmable hardware devices such as field programmable gate arrays, programmable array logic, programmable logic devices or the like.

Steps may also be implemented in software for execution by various types of processors. An identified step of executable code may, for instance, comprise one or more physical or logical blocks of computer instructions that may, for instance, be organized as an object, procedure, or function. Nevertheless, the executables of an identified step need not be physically located together, but may comprise disparate instructions stored in different locations which, when joined logically together, comprise the module and achieve the stated purpose for the module.

Indeed, a step in an executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A processor-based device for annotating video content comprising:
    an object identifier module for identifying one or more objects in the video content;
    a language tag generator module for generating one or more language tags for at least one of the one or more objects; and
    a utilization information generating module for associating the one or more language tags with utilization information;
    wherein the utilization information comprises display information configured to be used by a user device in displaying at least one of the one or more language tags with the video content.

2. A processor-based device for providing video content annotation comprising:
    a receiver interface for receiving a video content;
    a processor configured to:
        perform object recognition to identify one or more objects in the video content;
        generate one or more language tags for at least one of the one or more objects; and
        associate the one or more language tags with utilization information configured to be used by a user device in the displaying of at least one of the one or more language tags with the video content; and
    a network interface for providing the one or more language tags with associated utilization information to one or more user devices over a network.

3. The processor-based device of claim 2, wherein the processor performs object recognition by executing object recognition software.

4. The processor-based device of claim 2, wherein object recognition is based on identifying one or more of an object's shape, color, relative size, movement, and interaction with other objects.

5. The processor-based device of claim 2, wherein object recognition is partly based an audio track of the video content.

6. The processor-based device of claim 2, wherein object recognition further comprises identifying attributes of the one or more objects, the attributes comprises one or more of color, size, motion, and location of an object.

7. The processor-based device of claim 2, wherein the network interface further provides the video content to the user device.

8. The processor-based device of claim 2, wherein the one or more language tags are provided in a audio stream tags of a streaming video content.

9. The processor-based device of claim 2, wherein the one or more language tags are configured to be downloaded to the user device.

10. The processor-based device of claim 2, wherein the one or more languages tags are configured to be displayed as overlays of a separately provided video at the user device.

11. A method for providing annotated video content comprising:
receiving a video content;
identifying one or more objects in the video content using object recognition;
generating one or more language tags for at least one of the one or more objects; and
annotating the video content by overlaying the one of more language tags on the video content in a way as to label the at least one of the or more objects in the video content; and
providing the video content annotated with language tags to a user device over a network.

12. The method of claim 11, wherein the annotating of the video content is based on user settings.

13. The method of claim 12, wherein the user settings comprises one or more of: object type, vocabulary difficulty, object size, and object appearance duration.

14. The method of claim 11 further comprising:
generating interactive content corresponding to the one or more language tags; and
providing the interactive content to the user device.

15. The method of claim 14, wherein the interactive content is generated based on a user language skill level.

16. The method of claim 14, wherein the interactive content is generated using attributes of the one or more objects identified using object recognition.

17. The method of claim 14, wherein attributes of the one or more objects comprise one or more of color, size, motion, and location of the corresponding object.

18. The method of claim 11, wherein the video content annotated with language tags is streamed to the user device.

19. The method of claim 11, wherein the video content annotated with language tags is provided to the user device through a broadcast network.

20. A method for annotating video content comprising:
identifying one or more objects in a video content;
generating one or more tags for at least one of the one or more objects; and
associating the one or more tags with utilization information;
wherein the utilization information comprises display information configured to be used by a user device in the displaying of at least one of the one or more tags with the video content.

* * * * *